United States Patent
Unger et al.

(10) Patent No.: US 10,259,386 B2
(45) Date of Patent: Apr. 16, 2019

(54) LIGHT PIPING FOR INTERIOR TRIM

(71) Applicant: Lear Corporation, Southfield, MI (US)

(72) Inventors: Frank Unger, Oberding-Schwaig (DE); Alexander Sel, Augsburg (DE)

(73) Assignee: LEAR CORPORATION, Southfield, MI (US)

(*) Notice: Subject to any disclaimer, the term of this patent is extended or adjusted under 35 U.S.C. 154(b) by 0 days.

(21) Appl. No.: 15/970,289

(22) Filed: May 3, 2018

(65) Prior Publication Data
US 2019/0001877 A1   Jan. 3, 2019

(30) Foreign Application Priority Data
Jul. 3, 2017   (DE) .................. 10 2017 211 246

(51) Int. Cl.
| | |
|---|---|
| *B60Q 3/233* | (2017.01) |
| *B60R 13/02* | (2006.01) |
| *F21V 8/00* | (2006.01) |
| *B60N 2/58* | (2006.01) |
| *B60Q 3/64* | (2017.01) |

(52) U.S. Cl.
CPC .............. *B60Q 3/233* (2017.02); *B60N 2/58* (2013.01); *B60Q 3/64* (2017.02); *B60R 13/02* (2013.01); *G02B 6/001* (2013.01); *B60R 2013/0287* (2013.01); *B60R 2013/0293* (2013.01)

(58) Field of Classification Search
CPC .......... B60Q 3/233; B60R 13/02; G02B 6/001
See application file for complete search history.

(56) References Cited

U.S. PATENT DOCUMENTS

| | | |
|---|---|---|
| 6,450,678 B1 | 9/2002 | Bayersdorfer |
| 6,854,869 B1 | 2/2005 | Fernandez |
| 7,556,412 B2 | 7/2009 | Guillermo |
| 8,215,810 B2 | 7/2012 | Welch, Sr. et al. |
| 8,754,426 B2 | 6/2014 | Marx et al. |
| 9,440,582 B2 | 9/2016 | Bayersdorfer et al. |
| 2005/0242607 A1 | 11/2005 | Neumann |
| 2013/0077338 A1 | 3/2013 | Wenzel et al. |

(Continued)

FOREIGN PATENT DOCUMENTS

| | | |
|---|---|---|
| DE | 19724486 A1 | 12/1998 |
| DE | 102006052308 A1 | 5/2008 |
| DE | 112008002935 T5 | 9/2010 |

(Continued)

OTHER PUBLICATIONS

German Office Action issued in corresponding case No. DE 102017211246.8; dated Mar. 5, 2018; 9 pages.

*Primary Examiner* — Joseph L Williams
(74) *Attorney, Agent, or Firm* — Brooks Kushman P.C.

(57) ABSTRACT

A vehicle seat is provided having first and second trim panels having an outer appearance surface. An illumination trim portion separates the first and second trim panels. The illumination portion has a pocket formed of translucent material and has first and second lateral flaps disposed on opposite sides of a central tunnel. A first seam secures the illumination portion to the first trim panel and to the first lateral flap. A second seam secures the illumination portion to the second trim panel and to the second lateral flap. A light conducting strip is inserted in the central tunnel of the pocket. A light source is in communication with the light conducting strip. Light from the light source is visible through the translucent material of the central tunnel.

20 Claims, 3 Drawing Sheets

(56) References Cited

U.S. PATENT DOCUMENTS

2015/0298608 A1   10/2015   Aufmkolk

FOREIGN PATENT DOCUMENTS

| DE | 202014000342 U1 | 4/2014 |
| DE | 102013202224 A1 | 8/2014 |
| DE | 102015202018 A1 | 8/2016 |
| FR | 2886238 A1 | 12/2006 |
| FR | 2927859 B1 | 8/2010 |
| WO | 9829277 A2 | 7/1998 |
| WO | 2007047304 A1 | 4/2007 |

LIGHT PIPING FOR INTERIOR TRIM

CROSS-REFERENCE TO RELATED APPLICATIONS

This application claims priority to DE application 10 2017 211 246.8 filed Jul. 3, 2017 the disclosures of which are hereby incorporated in their entirety by reference herein.

TECHNICAL FIELD

The present application relates to interior components having illuminated portions.

BACKGROUND

As an aesthetic effect in interior trim components, the trim may include illuminated portions. One example is U.S. Pat. No. 8,215,810 assigned to Lear Corporation.

SUMMARY

According to one embodiment, a trim is provided having a first trim panel and a second trim panel adjacent the first trim panel. A light pipe pocket separates the first and second trim panels. The pocket has first and second lateral flaps disposed on opposite sides of a central tunnel of the pocket and an upper surface of the central tunnel is formed of translucent material. A first seam extends through the first trim panel and the first lateral flap of the pocket. A second seam extends through the second trim panel and the second lateral flap of the pocket.

According to another embodiment, a light conductive pipe is inserted in the pocket, wherein light from the light conductive pipe is illuminated through the translucent material thereby defining an illuminated portion between the first and second trim panels.

According to another embodiment, the first and second trim panel have a fold adjacent the pocket.

According to another embodiment, a third seam extends through two layers of the first trim panel and the first lateral flap of the pocket. A fourth seam extends through two layers of the second trim panel and the second lateral flap of the pocket. The first and second seams are concealed along an appearance surface of the first and second trim panels.

According to another embodiment, the light pipe pocket is formed of an upper material strip and a lower material strip. The upper strip is secured to the lower strip along the first and second lateral flaps.

According to one embodiment, vehicle seat is provided having first and second trim panels having an outer appearance surface. An illumination trim portion separates the first and second trim panels. The illumination portion has a pocket formed of translucent material and has first and second lateral flaps disposed on opposite sides of a central tunnel. A first seam secures the illumination portion to the first trim panel and to the first lateral flap. A second seam secures the illumination portion to the second trim panel and to the second lateral flap. A light conducting strip is inserted in the central tunnel of the pocket. A light source is in communication with the light conducting strip. Light from the light source is visible through the translucent material of the central tunnel.

According to another embodiment, the light source comprises a light emitting diode.

According to another embodiment, the pocket is woven to form the first and second lateral flaps and the channel defined between the flaps.

According to another embodiment, the pocket is formed of an upper strip and a lower material strip. The upper strip is secured to the lower strip along the flaps with adhesive.

According to one embodiment, a method of forming a trim component is provided. A light-pipe pocket is defined having a central tunnel of translucent material positioned between a first flap and a second flap. A first seam is sewn and extends through a first trim panel and the first lateral flap of the pocket. A second seam is sewn and extends through the second trim panel and the second lateral flap of the pocket.

According to another embodiment, a light conductive strip is inserted in the central tunnel of the pocket.

According to another embodiment, the light-pipe pocket is defined by securing an upper material strip to a lower strip along the first flap and the second flap.

According to another embodiment, the upper strip is secured to the lower strip along the first and second sides with adhesive. The central tunnel extends between the adhesive on the first and second sides.

According to another embodiment, the upper strip is thermally welded to the lower strip along the first and second sides. The central tunnel extends between thermal weld lines on the first and second sides.

According to another embodiment, the upper strip formed of a translucent material is arranged adjacent an appearance surface of the first and second trim panels.

According to another embodiment, the first and second trim panels are folded and a third seam is sewn through two layers of the first trim panel and the first lateral flap of the pocket. A fourth seam is sewn through two layers of the second trim panel and the second lateral flap of the pocket. The first and second seams are concealed along an appearance surface of the trim panels.

According to another embodiment, a light conductive strip is inserted in the pocket after sewing the first, second, third and fourth seams.

According to another embodiment, the light-pipe pocket is defined by weaving the light-pipe pocket.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
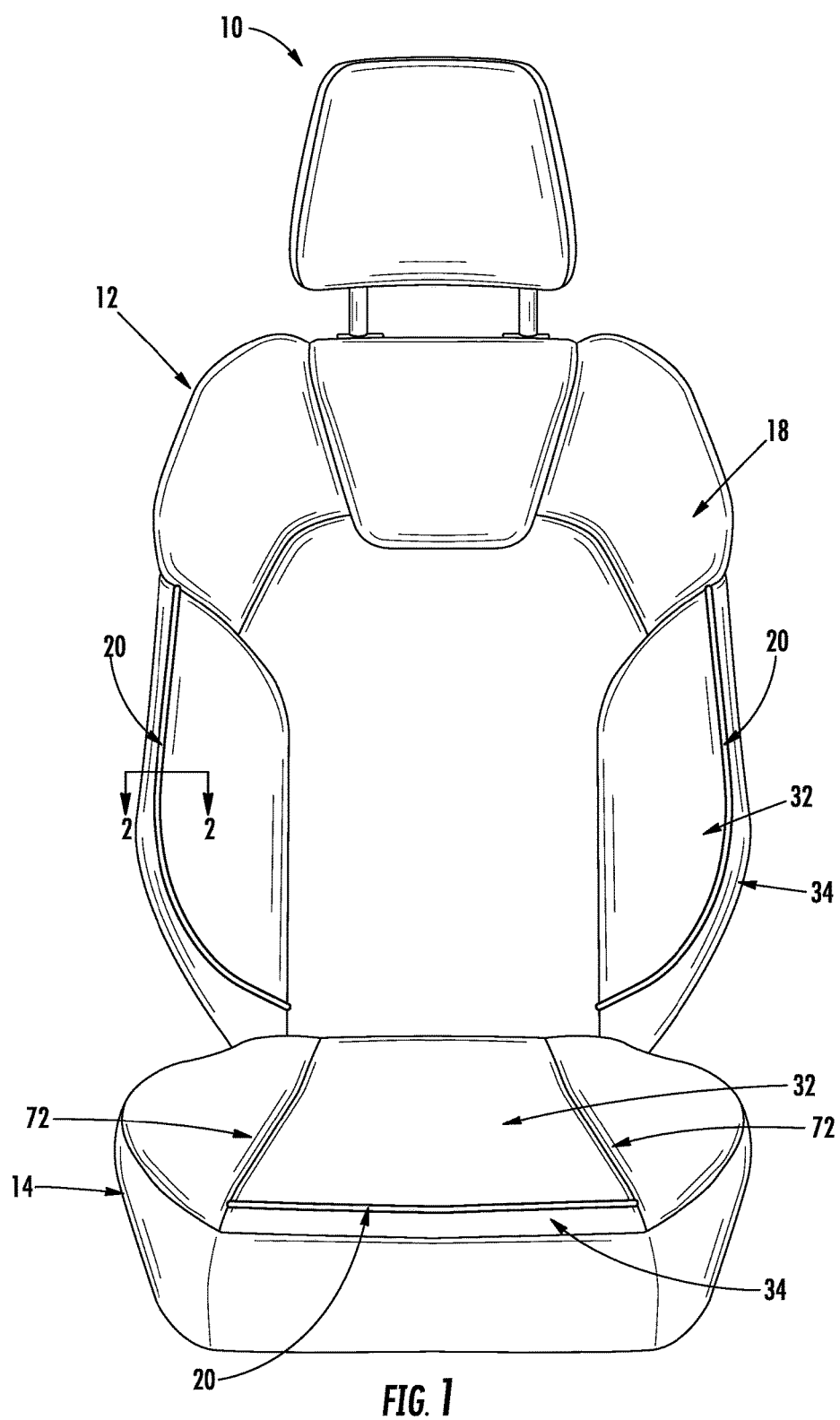
FIG. 1 is a perspective view of a vehicle seat having an illuminated portion according to at least one embodiment.

FIG. 1 illustrates a vehicle seat 10 having a seat back 12, a seat bottom 14, and a head restraint 16. The vehicle seat 10 has a seat frame and foam cushions and outer trim 18 covering the foam cushions. The trim 18 may include illuminated portions 20 defined as strips which may be illuminated from a source of light. The illuminated portions 20 may be linear strips or curved strips along the trim 18, as shown in FIG. 1. However, any shaped illuminated strip 20 may be defined along the trim between adjacent panels.

Figure 2:
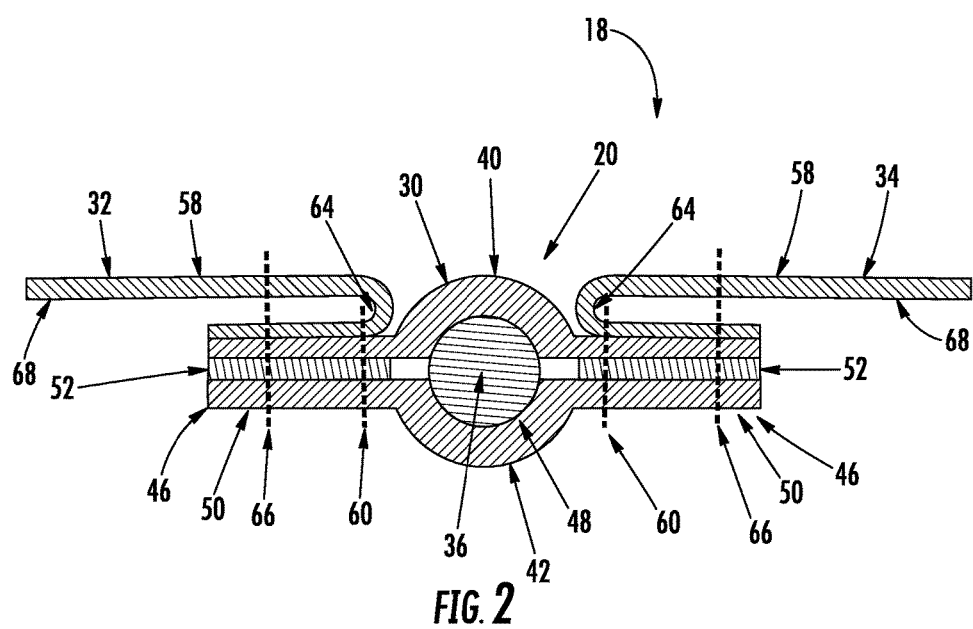
FIG. 2 is a cross section view of a portion of the trim of the vehicle seat of FIG. 1.

FIG. 2 illustrates section 2-2 along a portion of the trim 18 to show the illuminated portion 20 in more detail. As shown in FIG. 2, a pocket 30 formed of translucent material is sewn between a first trim panel 32 and a second trim panel 34. The trim cover 18 and each trim panel 32, 34 may be made of any suitable material, such as cloth, vinyl, or leather and may further include a layer of cushion or foam backing material, for example.

A light strip 36 is inserted in the pocket 30 after the pocket is sewn into the trim cover, thereby preventing damage to the light tube during shipping and installation of the trim cover. Light emitted from the light strip 36 is visible through the translucent material of the pocket 30. The light strip 36 may be an elongated light conductive element or light guide, also known as a 'light pipe,' that may be illuminated from a light source such as a light emitting diode (LED) provided at one end of the light pipe 36. Alternatively, multiple lights sources may be used. The light pipe may be an optical fiber or molded of transparent plastic to transmit light emitted from the light source.

As shown in FIG. 2, the pocket 30 is formed of an upper strip 40 and a lower strip 42 of material. The upper strip 40 is formed translucent material where light from the light source 36 is emitted and visible through the translucent material, thereby defining the illuminated portion between the first and second trim panels 32, 34. The translucent material has a thickness less than 2 mm and allows visible light to radiate therethrough. The lower strip 42 may also be formed of translucent material, or any suitable material strip.

Figure 3:
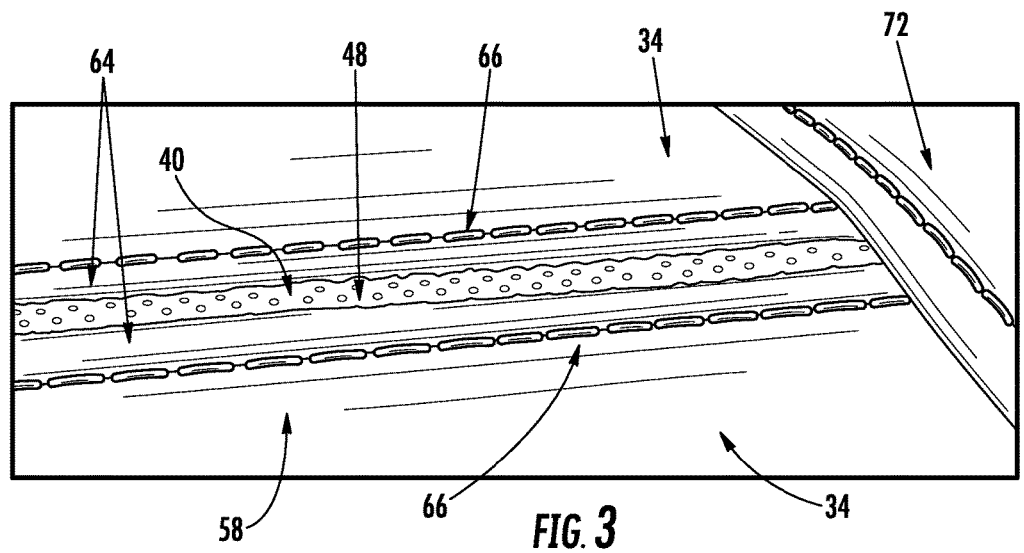
FIG. 3 is a top perspective view of a portion of the trim of the vehicle seat of FIG. 1.

The upper and lower strips 40, 42 are joined together along lateral edges 46 that extend the length of the material, as illustrated in FIG. 3. A central pocket tunnel 48 is formed between the lateral edges 46. The central tunnel 48 extends the length of the material and has a distal opening along at least one of the ends of the pocket 30 to receive the light strip 36.

As shown in FIG. 2, the upper and lower strips 40, 42 are joined together along the lateral edges 46 to form lateral flaps 50. The upper and lower strips 40, 42 may be joined together along the lateral edges 46 with adhesive or glue 52 or thermal welding or any other suitable method or device for forming lateral flaps 50. In another embodiment, the pocket 30 may be a woven tube. In the woven tube, the upper and lower strips 40, 42 are separated to form the central pocket tunnel 48, but the lateral flaps 50 are woven material and the upper and lower strips are integrally formed along the lateral flaps. In one embodiment, each of the lateral flaps 50 are 8-10 mm wide The trim component 18 is formed by positioning the pocket tunnel 48 between the first and second trim panels 32, 34. The upper strip 40 formed of translucent material and positioned adjacent an appearance surface 58 of the first and second trim panels 32, 34.

Each of the trim panels 32, 34 is sewn to the lateral edge flaps 50 along a closing seam 60. A first seam 60 is sewn and extends through a first trim panel 32 and the upper and lower strips 40, 42 along a first lateral flap 50 of the pocket 30. A second seam 60 is sewn and extends through the second trim panel 34 and the upper and lower strips 40, 42 along a second lateral flap 50 of the pocket 30.

The appearance surface 58 of the trim panels 32, 34 abuts the upper strip 40 while the first and second closing seams 60 are sewn. The trim panels 32, 34 are then folded so a fold 64 is formed adjacent the central tunnel 48 of the pocket 30. A deck seam 66 is sewn through each of the folded trim panels 32, 34 and through the lateral edge flaps 50. A third seam 66 extends through two layers of the first trim panel 32 and the upper and lower strips 40, 42 along the first lateral flap 50 of the pocket 30. A fourth seam 66 extends through two layers of the second trim panel 34 and the upper and lower strips 40, 42 along a second lateral flap 50 of the pocket 30.

FIG. 3 illustrates the appearance surface 58 of the trim cover 18. The third and fourth decking seams 66 are visible along the appearance surface 58. In the top view in FIG. 3, the closing seams 60 are concealed along the appearance surface 58 when the trim panels 32, 34 are folded.

Figure 4:
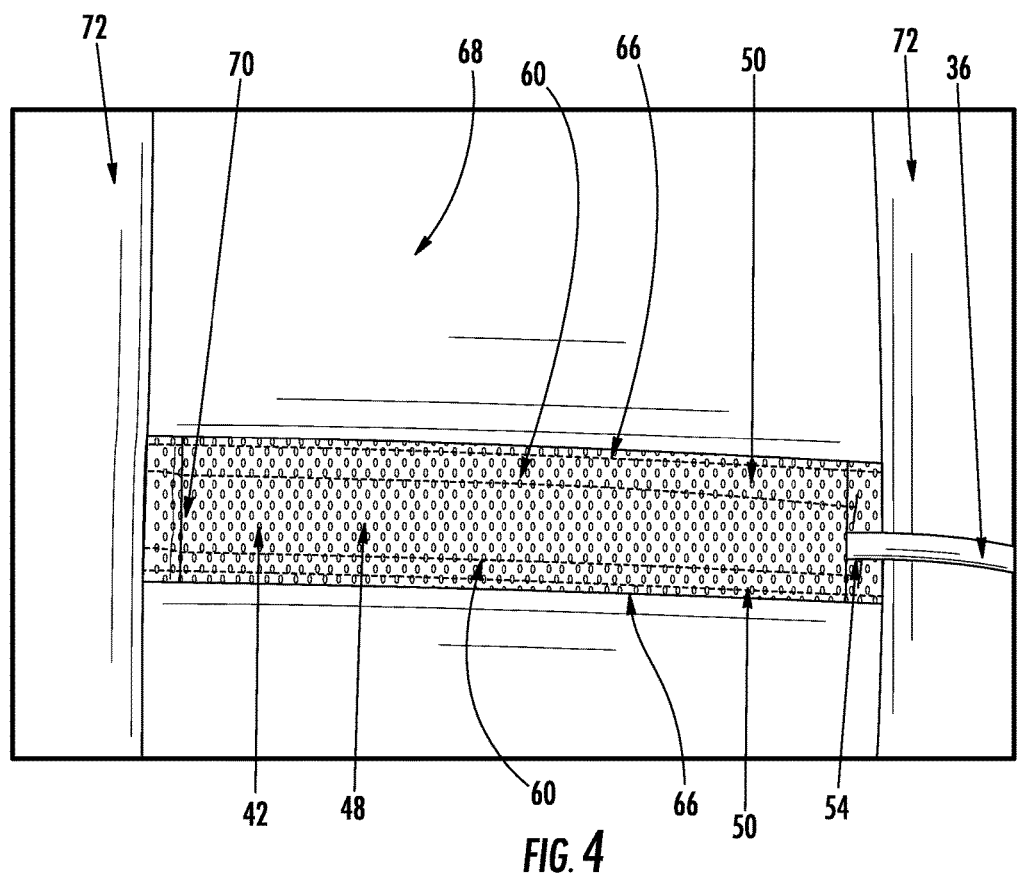
FIG. 4 is a bottom perspective view of the portion of the trim in FIG. 3.

FIG. 4 illustrates the rear surface of the trim cover 18, opposite the appearance surface 58, with the pocket 30 attached between two trim panels 32, 34. As shown in FIG. 4, the first and second closing seams 60 are visible along the back side 68 of the trim panels.

After the pocket 30 is sewn to the trim panels 32, 34, the light conductive strip 36 is inserted in the tunnel 48 though the distal opening 54. In some embodiments, the flexible light conductive strip may be inserted in the tunnel 48 of the pocket 30 after securing the trim component 18 to the vehicle seat assembly 10. The light conductive element 36 may be attached to a light source after being inserted in the tunnel 48 of the pocket 30.

As further shown in FIG. 4, an end seam 70 is sewn through the pocket 30, thereby closing the tunnel 48 and providing a stop for the light conductive strip 36. The end seam 70 may also extend through end trim panels 72 and lateral trim panels 32, 34 to form the trim cover.

In other trim cover designs, the light piping is sewn on top of the trim panels and/or extends above the trim panels, which increases the trim thickness and makes the appearance surface uneven since the light piping protrudes from the surface of the trim panel. These designs also require the light pipe to be sewn into the trim cover in the trim plan, which may damage the light pipe. The trim cover 18 with the illuminated portion 20 defined by the pocket 30 allows the light pipe 36 to be generally flush or even recessed from the appearance surface 58. The flush illuminated portion 20 is smooth and has improved durability and is more aesthetically pleasing. Further, the light pipe can be inserted after the sewing operation and avoids danger of damage.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A trim component comprising:
a first trim panel;
a second trim panel adjacent the first trim panel;
a light pipe pocket separating the first and second trim panels, the pocket having first and second lateral flaps disposed on opposite sides of a central tunnel of the pocket, wherein an upper surface of the central tunnel is formed of translucent material;
a first seam extending through the first trim panel and the first lateral flap of the pocket; and
a second seam extending through the second trim panel and the second lateral flap of the pocket.

2. The trim component of claim 1 further comprising a light conductive pipe inserted in the pocket, wherein light from the light conductive pipe is illuminated through the translucent material thereby defining an illuminated portion between the first and second trim panels.

3. The trim component of claim 1 wherein the first and second trim panel have a fold adjacent the pocket.

4. The trim component of claim 1 further comprising:
a third seam extending through two layers of the first trim panel and the first lateral flap of the pocket; and
a fourth seam extending through two layers of the second trim panel and the second lateral flap of the pocket,
wherein the first and second seams are concealed along an appearance surface of the first and second trim panels.

5. The trim component of claim 1 wherein the light pipe pocket is formed of an upper material strip and a lower material strip, wherein the upper strip is secured to the lower strip along the first and second lateral flaps.

6. A vehicle seat comprising a trim component according to claim 1.

7. A vehicle seat comprising:
first and second trim panels having an outer appearance surface;
an illumination trim portion separating the first and second trim panels, the illumination trim portion comprising:
a pocket formed of translucent material and having first and second lateral flaps disposed on opposite sides of a central tunnel;
a first seam securing the illumination trim portion to the first trim panel and to the first lateral flap;
a second seam securing the illumination trim portion to the second trim panel and to the second lateral flap; and
a light conducting strip inserted in the central tunnel of the pocket; and
a light source in communication with the light conducting strip, wherein light from the light source is visible through the translucent material of the central tunnel.

8. The vehicle seat of claim 7 wherein the light source comprises a light emitting diode.

9. The vehicle seat of claim 7 further comprising:
a third seam extending through two layers of the first trim panel and the first lateral flap of the pocket; and
a fourth seam extending through two layers of the second trim panel and the second lateral flap of the pocket,
wherein the first and second seams are concealed along the appearance surface.

10. The vehicle seat of claim 7 wherein the pocket is woven to form the first and second lateral flaps and the central tunnel defined between the flaps.

11. The vehicle seat of claim 10 wherein the pocket is formed of an upper strip and a lower material strip, wherein the upper strip is secured to the lower strip along the flaps with adhesive.

12. A method of forming a trim component, the method comprising:
defining a light-pipe pocket having a central tunnel of translucent material positioned between a first flap and a second flap;
sewing a first seam extending through a first trim panel and the first flap of the pocket; and
sewing a second seam extending through a second trim panel and the second flap of the pocket.

13. The method of claim 12 further comprising inserting a light conductive strip in the central tunnel of the pocket.

14. The method of claim 12 wherein defining the light-pipe pocket comprises securing an upper material strip to a lower strip along the first flap and the second flap.

15. The method of claim 14 further comprising securing the upper strip to the lower strip along the first flap and the second flap with adhesive, wherein the central tunnel extends between the adhesive on the first and second flaps.

16. The method of claim 14 further comprising thermally welding the upper strip to the lower strip along the first flap and the second flap, wherein the central tunnel extends between thermal weld lines on the first and second flaps.

17. The method of claim 14 further comprising arranging the upper strip formed of a translucent material adjacent an appearance surface of the first and second trim panels.

18. The method of claim 17 further comprising:
folding the first and second trim panels;
sewing a third seam through two layers of the first trim panel and the first flap of the pocket; and
sewing a fourth seam through two layers of the second trim panel and the second flap of the pocket,
wherein the first and second seams are concealed along an appearance surface of the trim panels.

19. The method of claim 18 further comprising inserting a light conductive strip in the pocket after sewing the first, second, third and fourth seams.

20. The method of claim 12 wherein defining the light-pipe pocket comprises weaving the light-pipe pocket.

* * * * *